Jan. 8, 1924.
J. M. JACOBS
STOCK WATERING APPARATUS
Filed Dec. 22, 1919
1,479,916
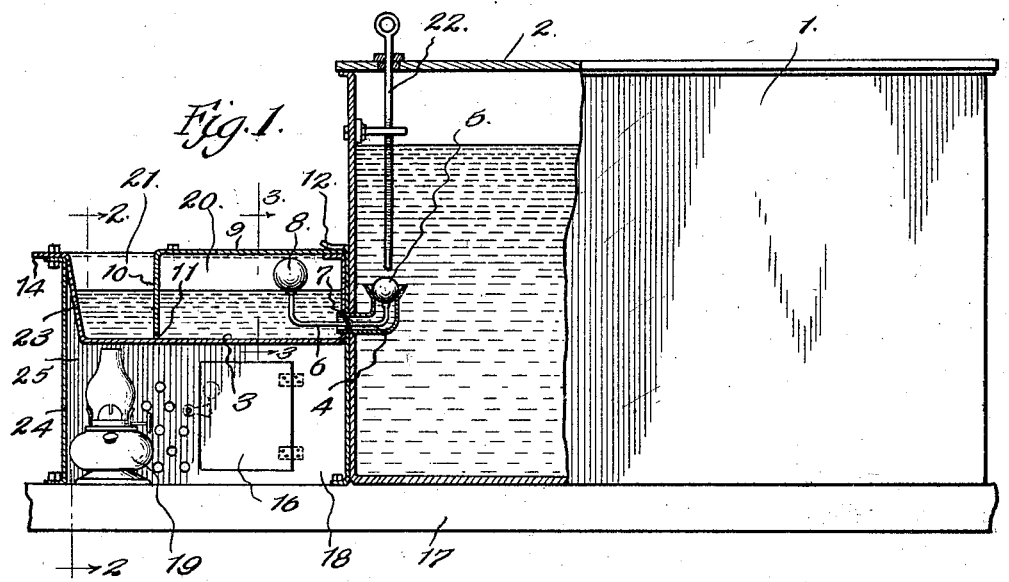
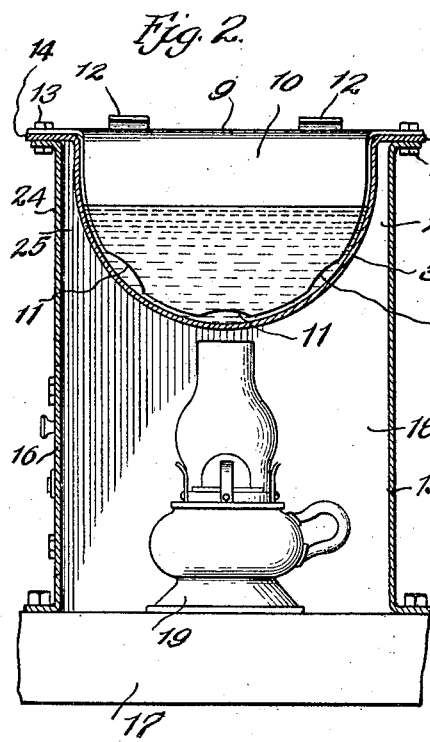
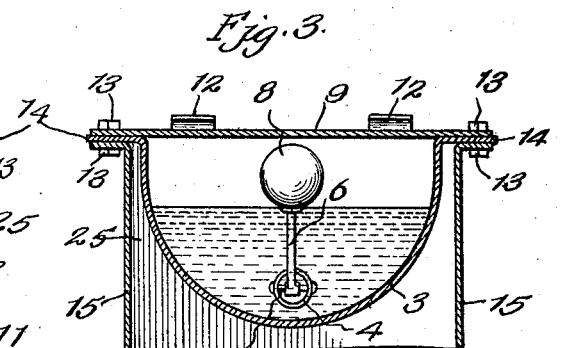
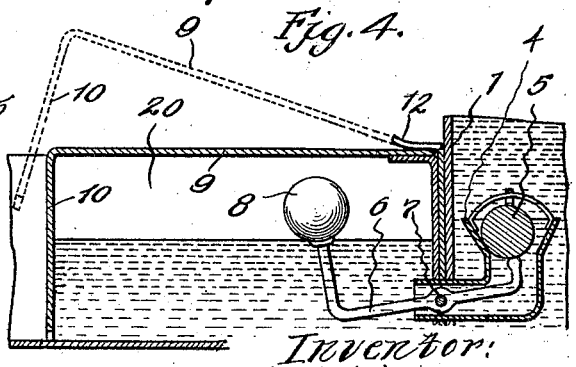
Inventor:
Joseph M. Jacobs.
By Arthur F. Durand
Atty Patented Jan. 8, 1924.

1,479,916

UNITED STATES PATENT OFFICE.

JOSEPH M. JACOBS, OF TAMPICO, ILLINOIS.

STOCK-WATERING APPARATUS.

Application filed December 22, 1919. Serial No. 346,768.

*To all whom it may concern:*

Be it known that I, JOSEPH M. JACOBS, a citizen of the United States of America, and a resident of Tampico, Illinois, have invented a certain new and useful Improvement in Stock-Watering Apparatus, of which the following is a specification.

This invention relates to apparatus for watering stock. On farms where hogs, cattle, horses and other stock are kept it becomes a problem to provide some sort of drinking tank or watering apparatus which will not freeze in cold weather. Various schemes have been proposed and employed for this purpose, and in some cases tanks have been provided having heating devices therein, or connected therewith, to prevent the body of water in the tank from freezing. Some of these arrangements are too expensive, and others have not been entirely satisfactory for various reasons.

Generally stated, therefore, the object of the invention is to provide a simple and inexpensive form of apparatus which can be easily heated, and which will be calculated to more satisfactorily insure a supply of water for drinking purposes in cold weather, than was heretofore possible with at least some of the apparatus employed for this purpose.

It is also an object to provide certain details and features of construction and combinations tending to increase the general efficiency and the desirability of a stock-watering apparatus of this particular character.

To these and other useful ends the invention consists in matters hereinafter set forth and claimed and shown in the accompanying drawings, in which—

Fig. 1 is a side elevation, partly in vertical longitudinal section, of a stock-watering apparatus embodying the principles of the invention.

Fig. 2 is an enlarged vertical section on line 2—2 in Fig. 1.

Fig. 3 is a similar section on line 3—3 in Fig. 1.

Fig. 4 is an enlarged sectional view, showing a portion of the structure shown in Fig. 1, but with the valve in a different position.

As thus illustrated, the tank 1 may be of the ordinary or usual character, such as those commonly provided for watering hogs, cattle, horses or other stock, and supplied with water in any suitable or desired manner. A tank of this character is ordinarily provided with a heating device (not shown) which is designed and intended to prevent the water from freezing in cold weather. For the purpose of the invention, said heating device may or may not be used, and in any event the tank is preferably covered in winter, as by a flat top 2 or any other suitable means, and the tank may be protected in various other ways, as by covering the whole thing with straw or hay or earth, with a view to keeping the water therein from freezing. Of course, though, such method of protection precludes the use of the tank itself as a drinking tank for the stock. Therefore, in order to provide means in conjunction with said tank for watering the stock in cold weather, a trough 3 is arranged at one side of the tank, and preferably secured thereto, with an inlet tube 4 arranged to supply water from the tank through the walls of the structure to the trough. Any suitable form of valve can be employed to control the discharge of water into the trough, and as shown said valve comprises a ball 5 to control the flared inlet of said tube, said ball being mounted on an arm 6 which is pivoted at 7 within the discharge end of the tube, and which has its other end provided with a hollow ball 8 which serves as a float within the trough, so that when the water in the latter rises to a certain level the valve will be closed and the supply of water from the tank to the trough will be automatically and temporarily cut off. For this purpose, therefore, it will be seen that the water in the tank is preferably maintained at a sufficient level to always insure a free supply of water to the trough when the valve opens. Preferably, a portion of the trough is covered by a flat top wall 9 which has a down-turned end portion 10 which forms a vertical partition in the trough. This wall 10 is preferably formed with notches or recesses 11 in the edges thereof, so that the water may feed freely from the covered compartment of the trough into the uncovered section thereof. The water is discharged, it will be seen, from the tube 4 straight through toward the wall 10, so that the water is forced directly from one end of the trough to the other. The entire structure, it will be seen, is preferably made of sheet metal and the cover 9 is held down at its end adjacent the tank 2 by sheet metal guards 12, which extend over this end of the cover, and at its other end the cover is secured in place by bolts 13 which are inserted through the cover and through the flanges 14 of said trough. The space below the trough is enclosed, and the trough itself is supported, by vertical sheet metal walls 15 which are also secured in place at their upper edges by said bolts. The trough is rounded in cross section, as shown, to stiffen the structure, a trough thus formed being strong and rigid, as well as easy to clean out; and, in addition, the formation provides clearance at each side of the trough, as will hereinafter more fully appear. A door 16 affords access to the compartment below the trough, and the entire structure may be mounted on a base 17, in any suitable or desired manner.

Heating means, of any suitable character, may be provided in the compartment 18 thus formed below the trough. For example, an ordinary lamp 19 may be employed for this purpose, said lamp being placed in the compartment below the trough, in any position which will best heat the latter and prevent the water therein from freezing. Thus the water is fed from the tank 1 into the covered compartment 20 of the drinking trough, where it is still maintained at a sufficiently high temperature to prevent freezing, and it is then fed into the uncovered section or compartment 21 of said trough, where it is available for drinking purposes, it being understood that the trough is placed at a height which makes it suitable for hogs, cattle, horses or other stock, and with this construction and arrangement there is always a supply of water in the compartment 21, and the water feeds into this compartment as fast as the level of the water is lowered in the trough. The compartment 20 provides a heated body of water which is maintained between the water in the tank 1 and the water in the drinking compartment 21, so that the water in the latter is less liable to freeze, and the whole trough is subject to the heat in the heating compartment provided below.

As shown in Fig. 1, a rod 22 can be provided above the ball 15 of the valve, so that said valve can be held closed, by pushing the lower end of said rod against the ball. In this way, in severe weather, and when it is desired to take precautions to prevent the water in the trough from freezing, say at night, the water can be dipped out of the trough, and the valve will stay closed to prevent additional water from being discharged into the trough. Said rod 22 can be frictionally held in its raised position, and when pushed down will block or prevent the opening of the valve, in the manner and for the purpose explained.

Preferably, also, the end wall 23 of the trough is inclined outwardly, so that some space is provided between this wall and the end wall 24 of the housing which provides the heating compartment below the trough. In this way there is space left not only at 25 at the sides of the trough, to keep the latter warm, but also at the outer end thereof, when the arrangement shown in Fig. 1 is employed, thereby to minimize the possibilities of the water being frozen within the trough.

From the construction shown and described it will be seen that the box-like structure forming the drinking compartment and the covered compartment and also the heating compartment below, may be located in any suitable or desired position, or any suitable or desired distance from the supply of water, and is not necessarily connected or joined directly to the water tank in the manner shown and described. The straight trough forming the float compartment 20 and the drinking compartment 21 is set down in the top of the box-like structure, and the water flows in at one end of this trough and travels longitudinally thereof, and then leaves the trough at its other end, and the flow of the water in this way, as well as the heat supplied below, tends to keep the water from freezing.

What I claim as my invention is:

In a stock watering apparatus, the combination of a sheet metal housing having sides (15) and ends forming a chamber, with a flange along the upper edges of said housing, a sheet metal trough curved in cross section and formed with a flange (14) to rest on said flange of the housing, so that upwardly diminishing spaces (25) are formed which extend upward to said flanges at each side of the trough, a flat sheet metal cover (9) having a vertical end wall (10) forming a partition in said trough, with provisions to permit the water to pass from one side of said partition to the other, bolts (13) passing through said flanges and cover to hold the latter in place, projections (12) bent inward from the upper edge of one end of the housing to extend over the end of said cover, so that by raising said cover said partition is also raised out of the trough, said sides (15) forming a chamber (18) below said trough, which chamber terminates upward at each side in said spaces (25), a door for said chamber, means in said chamber to heat said trough, and means adjacent to said projections (12) to supply water to this end of the trough.

JOSEPH M. JACOBS.